(12) United States Patent
Furusawa

(10) Patent No.: US 11,412,729 B2
(45) Date of Patent: Aug. 16, 2022

(54) ORGANISM INDUCING DEVICE AND ORGANISM INDUCING UNIT

(71) Applicant: Yosuke Furusawa, Takizawa (JP)

(72) Inventor: Yosuke Furusawa, Takizawa (JP)

( * ) Notice: Subject to any disclaimer, the term of this patent is extended or adjusted under 35 U.S.C. 154(b) by 345 days.

(21) Appl. No.: 16/499,826

(22) PCT Filed: Jun. 8, 2018

(86) PCT No.: PCT/JP2018/022107
§ 371 (c)(1),
(2) Date: Sep. 30, 2019

(87) PCT Pub. No.: WO2019/035266
PCT Pub. Date: Feb. 21, 2019

(65) Prior Publication Data
US 2020/0022357 A1    Jan. 23, 2020

(30) Foreign Application Priority Data
Aug. 15, 2017   (JP) .............................. JP2017-156934

(51) Int. Cl.
*A01M 29/24* (2011.01)
*H02S 40/38* (2014.01)
*H02J 7/35* (2006.01)

(52) U.S. Cl.
CPC ............... *A01M 29/24* (2013.01); *H02J 7/35* (2013.01); *H02S 40/38* (2014.12)

(58) Field of Classification Search
CPC .......... A01M 29/24; A01M 29/28; H02J 7/35; H02S 40/38; Y02E 10/50; Y02E 70/30
See application file for complete search history.

(56) References Cited

U.S. PATENT DOCUMENTS

| | | | |
|---|---|---|---|
| 3,633,001 A | 1/1972 | Vajnovszky et al. | |
| 5,460,123 A * | 10/1995 | Kolz | A01K 79/02 119/220 |
| 6,223,464 B1 | 5/2001 | Nekomoto et al. | |
| 2004/0093788 A1* | 5/2004 | Toyota | A01M 29/08 43/124 |
| 2007/0236356 A1 | 10/2007 | Zhang et al. | |
| 2011/0023792 A1 | 2/2011 | Osypka | |
| 2018/0310916 A1* | 11/2018 | Loebl | B06B 1/0215 |

FOREIGN PATENT DOCUMENTS

| | | |
|---|---|---|
| CN | 2418683 Y | 2/2001 |
| CN | 1946287 A | 4/2007 |
| CN | 202535985 U | 11/2012 |

(Continued)

OTHER PUBLICATIONS

Office Action dated Mar. 10, 2021, in CN Application No. 201880019189.5, 8 pages.

(Continued)

*Primary Examiner* — Thomas C Lee
*Assistant Examiner* — Charles Cai

(57) ABSTRACT

An organism inducing device, installed on an installation surface, includes a tile-shaped body; a plurality of electrodes provided to a top surface of the body; and a processor configured to separately control power to be supplied to each of the electrodes, using power supplied from a predetermined power source.

10 Claims, 12 Drawing Sheets

(56) References Cited

FOREIGN PATENT DOCUMENTS

| | | |
|---|---|---|
| CN | 205337317 U | 6/2016 |
| GB | 2521817 A | 7/2015 |
| JP | H02-039842 A | 2/1990 |
| JP | 2002-000164 A | 1/2002 |
| JP | 2003-204749 A | 7/2003 |
| JP | 2007-274954 A | 10/2007 |

OTHER PUBLICATIONS

International Search Report for International Application No. PCT/JP2018/022107 dated Sep. 4, 2018, 10 pages.
Extended European Search Report dated Apr. 20, 2021; in EP Application No. 18846431.7 filed Jun. 8, 2018, 15 pages.

* cited by examiner

FIG.5A

| ORGANISM | VOLTAGE | FREQUENCY | DUTY RATIO |
|---|---|---|---|
| ALL | 10 V | 1.0 KHz | 50% |
| ORGANISM A | 5 V | 1.2 KHz | 25% |
| ORGANISM B | 10 V | 1.0 KHz | 50% |
| ORGANISM C | 12 V | 800 Hz | 75% |
| ⋮ | ⋮ | ⋮ | ⋮ |

FIG.5B

| ELECTRODE | VOLTAGE | FREQUENCY | DUTY RATIO |
|---|---|---|---|
| $A_1$ | 10 V | 1.0 KHz | 50% |
| $A_2$ | 10 V | 1.0 KHz | 50% |
| ... | ... | ... | ... |
| $A_N$ | 0 V | – | – |
| $B_1$ | 10 V | 1.0 KHz | 50% |
| $B_2$ | 10 V | 1.0 KHz | 50% |
| ... | ... | ... | ... |
| $B_N$ | 0 V | – | – |

ORGANISM INDUCING DEVICE AND ORGANISM INDUCING UNIT

TECHNICAL FIELD

The present invention relates to an organism inducing device and an organism inducing unit.

BACKGROUND ART

A technology is known by which power of a high voltage is supplied to electrodes arranged to surround a predetermined area and thereby an organism such as a pest is driven off so that the organism is prevented from entering a predetermined area.

For example, below-mentioned Patent Document 1 discloses a technology by which alternating-current power of predetermined frequency and voltage is supplied to electrodes provided around a building or embedded in the ground under a floor of the building whereby a pest is controlled or driven off by an electric field generated by the electrodes. According to the technology, it is possible to effectively control or drive off a pest such as a termite otherwise approaching the floor of the building from the ground.

PRIOR ART DOCUMENTS

Patent Documents

Patent Document 1: Japanese Laid-Open Patent Application No. 2007-274954

SUMMARY OF THE INVENTION

Problem to be Solved by the Invention

However, according to the prior art, the electrodes need to be shaped to correspond to the shape of an installation surface. As a result, the versatility of the electrodes is low and it is difficult to reduce the manufacturing costs of the electrodes and the whole system. Also, according to the prior art, it is difficult to change the arrangement of the electrodes once the electrodes are installed, and therefore, it is impossible to variously change the area where the electric field is generated to drive off an organism. In addition, according to the prior art, an organism is killed by power of a high voltage so that it is not possible to induce an organism into a predetermined direction to catch the organism alive.

In order to solve the above-described problems of the prior art, the present invention has an object to provide an organism inducing device that can be easily installed according to the shape of an installation surface, can variously change an area where an electric field is generated, and can induce an organism in a predetermined direction.

Means for Solving the Problem

In order to solve the above-described problems, an organism inducing device according to the present invention, installed on an installation surface, includes a tile-shaped body; a plurality of electrodes provided to a top surface of the body; and a control means configured to separately control power to be supplied to each of the electrodes, using power supplied from a predetermined power source.

Advantageous Effect of the Invention

According to the present invention, it is possible to provide an organism inducing device configured to be easily installed according to the shape of an installation surface, configured to variously change an area where an electric field is generated, and configured to induce an organism in a predetermined direction.

BRIEF DESCRIPTION OF THE DRAWINGS

FIG. 5A illustrates an example of information stored in a memory provided in the organism inducing device according to the mode for carrying out the present invention.

FIG. 5B illustrates an example of information stored in the memory provided in the organism inducing device according to the mode for carrying out the present invention.

MODES FOR CARRYING OUT THE INVENTION

Hereinafter, modes for carrying out the present invention will be described with reference to the drawings.

[Schematic Configuration of Organism Inducing Device 100]

First, a schematic configuration of an organism inducing device 100 will be described with reference to FIGS. 1-3.

Figure 1:
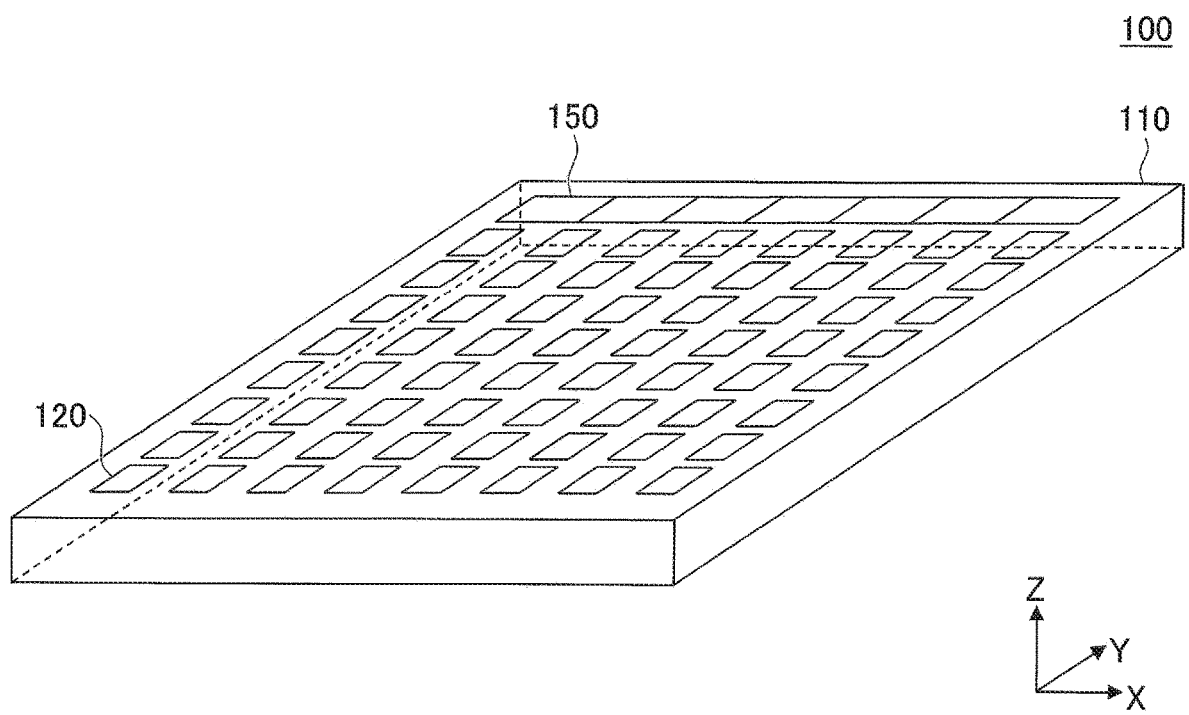
FIG. 1 is an external perspective view of an organism inducing device according to a mode for carrying out the present invention.

FIG. 1 is an external perspective view of an organism inducing device 100 according to a mode for carrying out the present invention. FIG. 2 is a plan view of the organism inducing device 100 according to the mode for carrying out the present invention. FIG. 3 is an A-A cross-sectional view of the organism inducing device 100 illustrated in FIG. 2.

Figure 2:
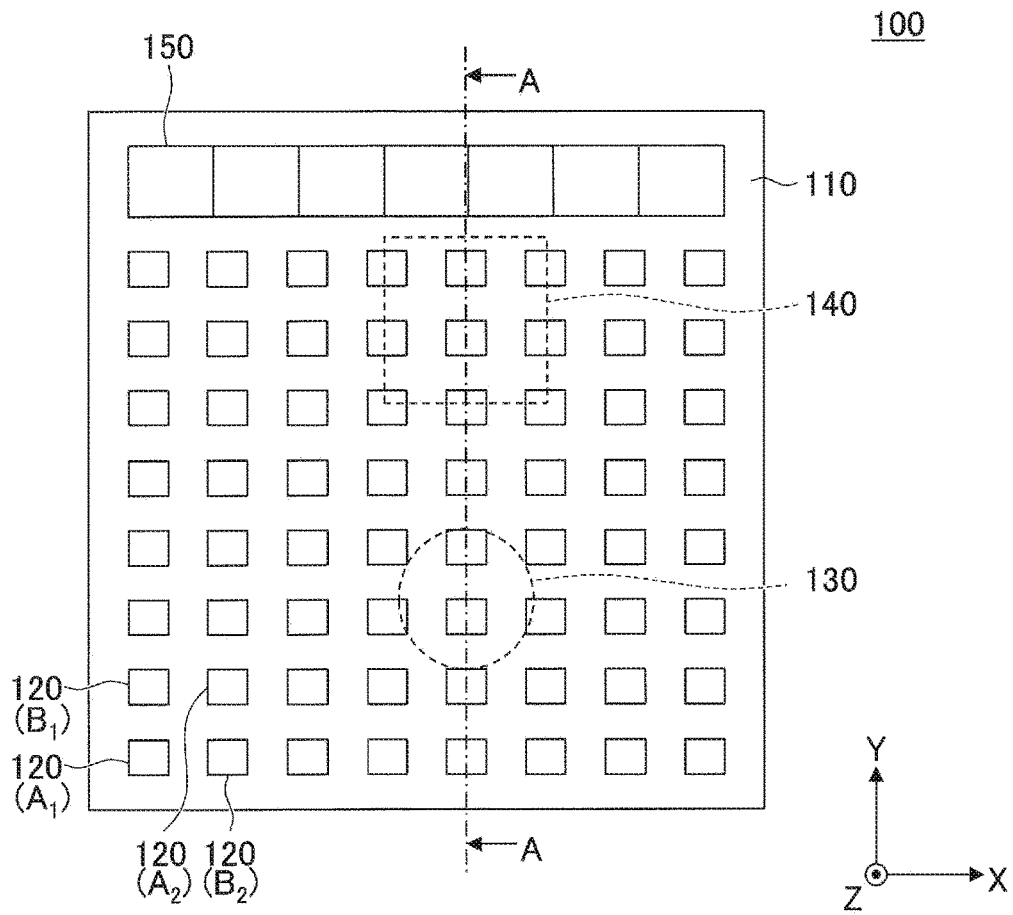
FIG. 2 is a plan view of the organism inducing device according to the mode for carrying out the present invention.
Figure 3:
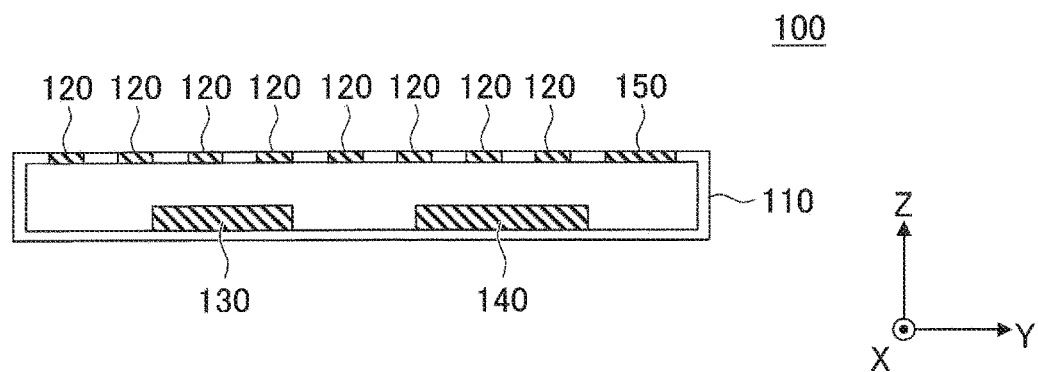
FIG. 3 is an A-A cross-sectional view of the organism inducing device illustrated in FIG. 2.

The organism inducing device 100 illustrated in FIGS. 1-3 is a device that is installed on an installation surface (such as the ground, a paving surface, a floor surface, a wall surface, or a roof). The organism inducing device 100 is configured to induce an organism such as an insect or a pest moving on the installation surface to a predetermined catching area or to prevent entry of the organism into a predetermined controlling area. As illustrated in FIGS. 1-3, the organism inducing device 100 includes a body 110, a plurality of electrodes 120, a battery 130, a controller 140, and a solar cell panel 150. In each figure, directions parallel to the installation surface of the organism inducing device 100 are referred to as an X-axis direction and a Y-axis direction; a direction perpendicular to the installation surface of the organism inducing device 100 is referred to as a Z-axis direction.

The body 110 is a tile-shaped member and provides an outer shape of the organism inducing device 100. In the body 110, the elements (i.e., the electrodes 120, the battery 130, the controller 140, and the solar cell panel 150) are set. The body 110 may be made of, for example, an insulating material such as ceramic, porcelain, concrete, resin, glass, wood, or the like. In the example illustrated in FIGS. 1 to 3, the body 110 is plate-shaped (in the form of a thin tile) but is not limited thereto. For example, the body 110 may be in the form of a sheet (a thinner tile), a box (a thicker tile), or the like. In the example illustrated in FIGS. 1-3, the body 110 has a rectangular shape in a plan view (i.e., has a shape of a thin rectangular parallelepiped) but is not limited thereto. For example, the body 110 may have a circular shape, a polygonal shape, or the like in a plan view. In the example illustrated in FIG. 3, the body 110 has a hollow structure but need not have a hollow structure.

The electrodes 120 are arranged as a matrix-like array in a top surface of the body 110. The electrodes 120 are all arranged in a configuration of points. In the example illustrated in FIGS. 1 and 2, the 64 electrodes 120 are arranged in a matrix of 8 rows by 8 columns in the top surface of the body 110. The electrodes 120 may be made of a conductive material such as, for example, copper, copper tungsten, silver tungsten, brass, aluminum, or the like. In the example illustrated in FIGS. 1 and 2, each electrode 120 has a rectangular shape in a plan view but may have another shape (such as a circular shape).

The electrodes 120 may be combined in a plurality of combinations; each combination of the plurality of combinations includes two electrodes 120 next to each other. For example, in the example illustrated in FIG. 2, the electrodes 120 include electrodes $A_1, A_2, \ldots, A_N$ and electrodes $B_1, B_2, \ldots, B_N$, where N is an integer greater than or equal to 1, and, according to the mode for carrying out the present invention (the present carrying-out mode), is 32 (i.e., N=32). In this example, the electrode 120 ($A_1$) may be combined with any one of the electrodes 120 ($B_1$), the electrode 120 ($B_2$), and the electrode 120 ($A_2$), each being next to the electrode 120 ($A_1$). In each of the combinations, one electrode and the other electrode are supplied with alternating-current power with different voltage polarities. For example, when alternating-current power with a positive voltage polarity is supplied to one electrode, alternating-current power with a negative voltage polarity is supplied to the other electrode. In the same way, when alternating-current power with a negative voltage polarity is supplied to one electrode, alternating-current power with a positive voltage polarity is supplied to the other electrode. As illustrated in FIG. 2, when the electrodes 120 are arranged like a matrix, it is possible to control, in the top surface of the body 110, electrodes to which alternating-current power with a positive voltage polarity is supplied and electrodes to which alternating-current power with a negative voltage polarity is supplied to be arranged alternately in both the X-axis direction and the Y-axis direction of FIG. 2. This causes, for both the X-axis direction and the Y-axis direction of FIG. 2, alternating-current power with different voltage polarities to be supplied to two electrodes 120 next to one another, whereby the alternating-current power stimulates an organism contacting these two electrodes 120.

A combination of electrodes 120 is not limited to such a combination of two electrodes next to each other. Two electrodes 120 that are not next to one another may be combined instead. For example, depending on relationships between the sizes and intervals of the electrodes 120 and the size of an organism to be induced (in particular, the foot-to-foot space of an organism in the case where the organism has feet), applying a voltage to electrodes 120 that are next to one another may fail to provide electrical stimulation to an organism as a result of the organism not contacting these electrodes 120. In such a case, the interval between two electrodes 120 to be combined may be determined depending on the sizes and intervals of the electrodes 120 and the size of an organism to be induced.

The battery 130 is provided inside the body 110. The battery 130 is an example of a "predetermined power source" and of a "secondary battery"; and supplies power (DC power) to the controller 140. For example, a lithium-ion battery, a nickel-hydrogen battery, or the like may be used as the battery 130. The organism inducing device 100 may use an external power source instead of using the battery 130 (an internal power source) as the "predetermined power source". In such a case, the external power source may be a DC power source (for example, an external battery, or the like) or an alternating-current power source (for example, a commercial power supply, or the like). However, by providing the battery 130 inside the body 110 as in the present carrying-out mode, it becomes not necessary to take account of a connection with an external power supply upon installing the organism inducing device 100, and thus it is possible to further improve the ease of installation of the organism inducing device 100.

The controller 140 is provided inside the body 110. The controller 140 is electrically connected to each of the electrodes 120 via wiring (not illustrated). The controller 140 is an example of a "control means" that uses power supplied from the battery 130 to control power to be supplied to each of the electrodes 120. In more detail, the controller 140 converts DC power supplied from the battery 130 into alternating-current power through a DC-AC inverter (such as a sine wave inverter, a rectangular wave inverter, or the like) provided by the controller 140. The controller 140 then supplies generated alternating-current power to each of the electrodes 120.

The controller 140 is configured to separately control power to be supplied to each of the electrodes 120. Such control is implemented as a result of, for example, in the controller 140, a CPU executing a predetermined control program. For example, the controller 140 is configured to supply power to all of the electrodes 120 of the organism inducing device 100 and also, to supply power to only predetermined electrodes 120 from among the electrodes 120. In either case, the controller 140 is configured to supply power to the corresponding electrodes 120 based on a suitable power setting value (such as a voltage, a frequency, as duty ratio, or the like) to control a predetermined organism.

For example, the controller 140 is configured to supply power with a relatively small voltage value to the corresponding electrodes 120 when the size of the predetermined organism is relatively small. In another example, the controller 140 is configured to supply power with a relatively high voltage value to the corresponding electrodes 120 when the size of the predetermined organism is relatively large. In yet another example, the controller 140 is configured to supply power with a frequency and a duty ratio to which the predetermined organism is sensitive to the corresponding electrodes 120. Details of the control to be implemented by the controller 140 will be described later with reference to FIG. 6.

The controller 140 includes a memory 142. The memory 142 stores a first setting table 502 and a second setting table 504. In the first setting table 502, suitable power setting values for controlling various types of organisms are stored on a per-type of organism basis. In the second setting table 504, suitable power setting values for power to be supplied to the electrodes 120 of the organism inducing device 100 are stored. Details of the first setting table 502 and the second setting table 504 will be described later with reference to FIG. 5.

The solar cell panel 150 is installed in the top surface of the body 110. In response to the top faces of solar cells inside the solar cell panel 150 being irradiated with light, the solar cell panel 150 generates power due to the photovoltaic effect of the solar cells. Power generated by the solar cell panel 150 is supplied to the battery 130 and used to charge the battery 130. The organism inducing device 100 according to the present carrying-out mode is thus provided with the solar cell panel 150 so that the organism inducing device 100 can work for a long time by power supplied from the battery 130 without being connected to an external power source. In the example illustrated in FIG. 2, the solar cell panel 150 is provided in a section of the top surface of the body 110 where the electrodes 120 are not provided, but the arrangement is not limited thereto. For example, the electrodes 120 may be provided on the solar cell panel 150. In such a case, the solar cell panel 150 may be installed throughout the top surface of the body 110.

For example, a plurality of organism inducing devices 100 each being thus configured may be arranged and installed on a planar installation surface (such as the ground, a paving surface, a floor surface, a wall surface, a roof, or the like) either outdoors or indoors. In such a case, the organism inducing devices 100 may be fixed to the installation surface by an adhesion means (such as an adhesive, mortar, a double-sided tape, or the like) such that the bottom surfaces of the bodies 110 are adhered to the installation surface (such as a paving surface, a floor surface, a wall surface, a roof, or the like). For example, the organism inducing devices 100 may be provided with pile-like members projecting from the bottom surfaces of the bodies 110; the pile-like members may be embedded in the ground so that the organism inducing devices 100 may be fixed to the installation surface (the ground or the like). In addition, for example, the organism inducing devices 100 may be fixed to the installation surface (the ground or the like) as a result of portions of the bodies 110 being embedded in the ground for a case where the bodies 110 have predetermined vertical thickness.

Furthermore, for example, each organism inducing device 100 may be connected with another organism inducing device 100 next thereto with the use of any one of various types of connecting means.

[Electrical Connection in Organism Inducing Device 100]

Figure 4:
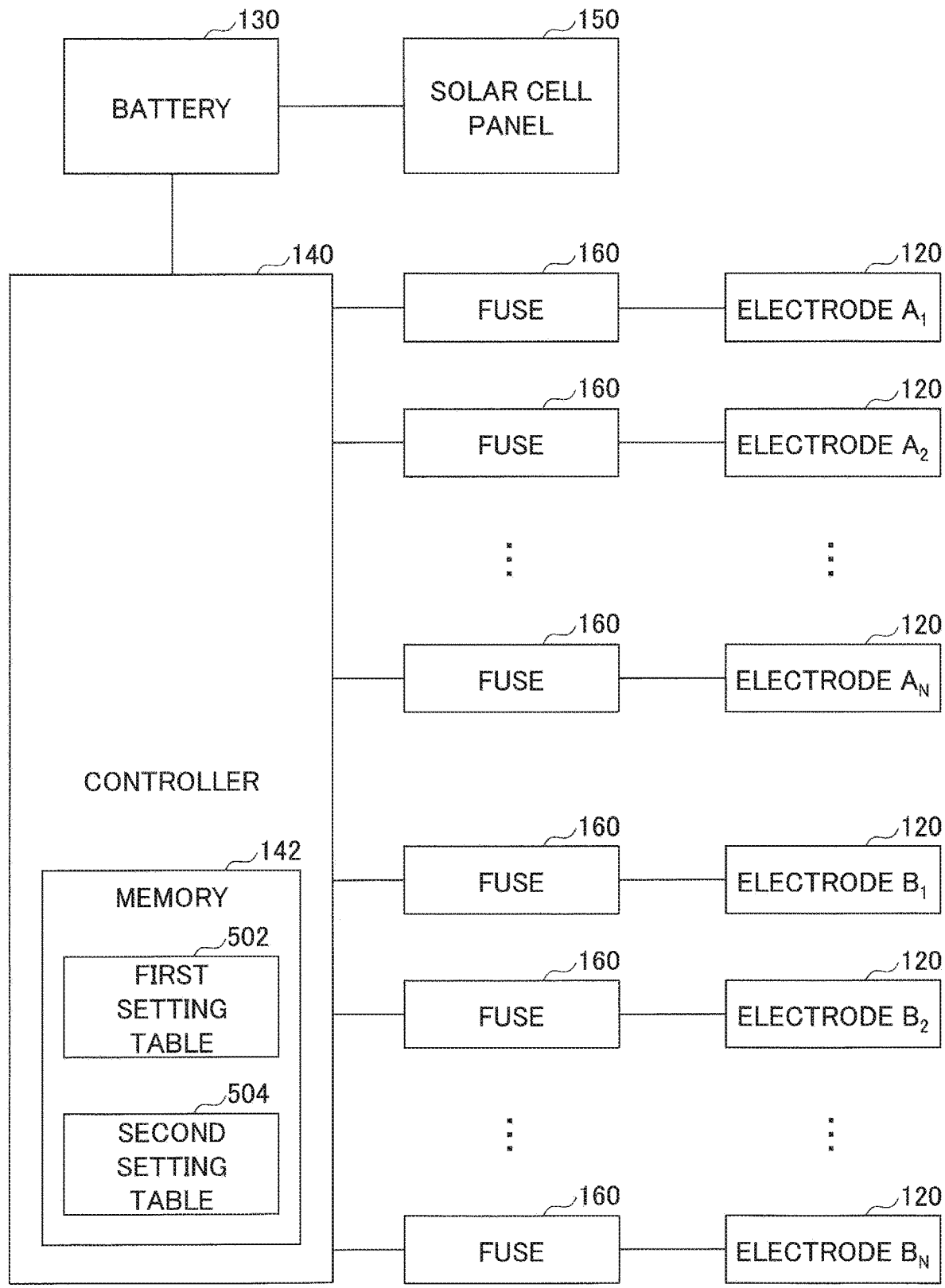
FIG. 4 illustrates an electrical connection in the organism inducing device according to the mode for carrying out the present invention.

Referring now to FIG. 4, electrical connection in the organism inducing device 100 will be described. FIG. 4 is a diagram illustrating electrical connection in the organism inducing device 100 according to the mode for carrying out the present invention.

As illustrated in FIG. 4, each of the electrodes 120 is electrically connected to the controller 140. This allows the controller 140 to separately supply power to each of the electrodes 120.

As illustrated in FIG. 4, the electrodes 120 include electrodes $A_1, A_2, \ldots, A_N$ and electrodes $B_1, B_2, \ldots, B_N$. The controller 140 may supply alternating-current power with mutually different voltage polarities to two electrodes 120 next to each other.

As illustrated in FIG. 4, the controller 140 includes the memory 142. In the memory 142, the first setting table 502 and the second setting table 504 are stored. The controller 140 is configured to separately supply power to each of the electrodes 120 based on the first setting table 502 and the second setting table 504 stored in the memory 142.

As illustrated in FIG. 4, the battery 130 is electrically connected to the controller 140. This allows the controller 140 to supply power (alternating-current power) to each of the electrodes 120 using power (DC power) supplied from the battery 130.

As illustrated in FIG. 4, the solar cell panel 150 is electrically connected to the battery 130. This allows the battery 130 to be charged by power supplied from the solar cell panel 150.

As illustrated in FIG. 4, the organism inducing device 100 according to the present carrying-out mode includes fuses 160 for the electrodes 120, respectively, as examples of "protective devices" between the fuses 160 and the controller 140. Thus, even if an electrode 120 is short-circuited due to an adhesion of a foreign matter or an organism to the electrode 120 and an overcurrent flows through the electrode 120, the organism inducing device 100 can avoid a damage to the circuit otherwise occurring due to the overcurrent, by disconnecting the electrode 120 from the circuit by the fuse 160 connected to the electrode 120.

[Example of Information Stored in Memory 142]

FIG. 5 illustrates examples of information stored in the memory 142 of the organism inducing device 100 according to the mode for carrying out the present invention.

FIG. 5A of FIG. 5 illustrates an example of the first setting table 502 stored in the memory 142. The first setting table 502 is a table where suitable power setting values for controlling a corresponding organism are set on a per-type of organism basis. In the example illustrated in FIG. 5A, the first setting table 502 includes "voltage", "frequency", and "duty ratio" as data items of power setting values. As a "voltage", a "frequency", and a "duty ratio", values that are effective in controlling an organism are set. In particular, as a "voltage", a voltage value that does not kill an organism is set. A "duty ratio" is set only for a case where alternating-current power to be supplied to an electrode 120 is rectangular-wave power.

The inventor of the present invention found, through a test and so forth, that it is suitable to set a voltage value within the range of 0 to 12 V as a "voltage" depending on the type of an organism. In addition, the inventor of the present invention found, through a test and so forth, that it is suitable to set a frequency value within the range of 300 to 2.0 KHz as a "frequency" depending on the type of an organism.

The first setting table 502 may be provided in an external device (such as a personal computer, a smartphone, a tablet terminal, or the like) that can be connected to the organism inducing device 100. In such a case, for example, the controller 140 may obtain power setting values corresponding to a type of an organism to be induced or controlled from such an external device.

In the example illustrated in FIG. 5A, power setting values for all types of organisms are set in the first setting table 502. These power setting values are used for a case where a plurality of types of organisms are to be induced or controlled.

FIG. 5B of FIG. 5 illustrates an example of the second setting table 504 stored in the memory 142. The second setting table 504 is a table where power setting values for power to be supplied to the respective electrodes 120 of the organism inducing device 100 are set. In the example illustrated in FIG. 5B, the second setting table 504 includes data items "voltage", "frequency", and "duty ratio" of power setting values.

The organism inducing device 100 according to the present carrying-out mode is configured to supply power to electrodes 120 in one area and not to supply power to electrodes 120 in another area. For example, in the example illustrated in FIG. 5B, power is supplied to the electrodes $A_1$, $A_2$, $B_1$, and $B_2$, and power is not supplied to the electrodes $A_N$ and $B_N$. In particular, for the electrodes $A_1$, $A_2$, $B_1$, and $B_2$, "10 V" is set as a "voltage", "1.0 KHz" is set as a "frequency", and "50%" is set as a "duty ratio". These power setting values correspond to the power setting values for an "organism B" illustrated in FIG. 5A. That is, in the example illustrated in FIG. 5B, the electrodes $A_1$, $A_2$, $B_1$, and $B_2$ in one area are set to induce or control an "organism B" in the second setting table 504.

[Control Procedure by Controller 140]

Figure 6:
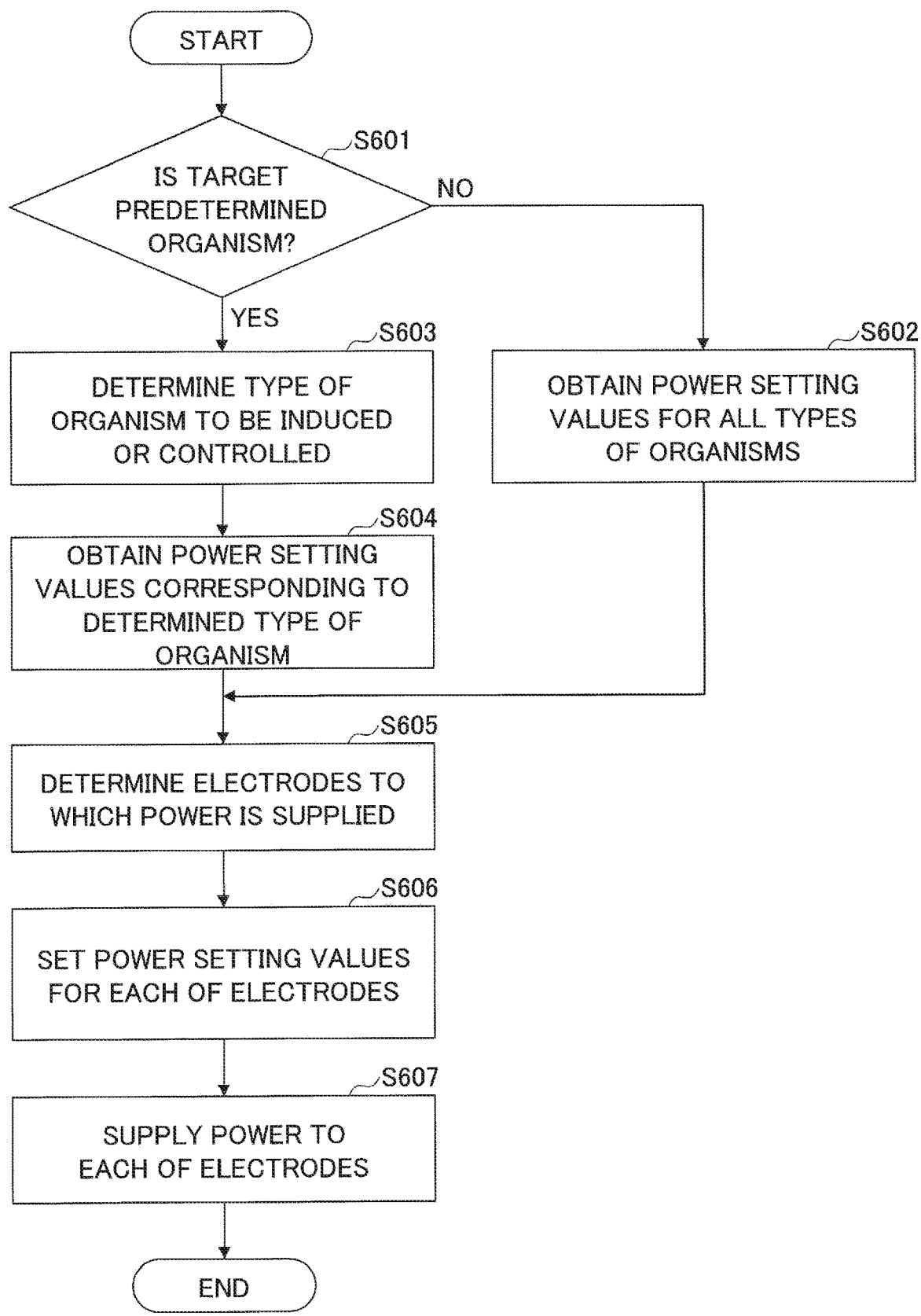
FIG. 6 is a flowchart illustrating a control procedure executed by a controller provided in the organism inducing device according to the mode for carrying out the present invention.

FIG. 6 is a flowchart illustrating a procedure for control by the controller 140 of the organism inducing device 100 according to the mode for carrying out the present invention.

First, the controller 140 determines whether to determine a type of an organism to be induced or controlled (step S601). It is set as to whether to determine a type of an organism to be induced or controlled by, for example, an external device (such as a personal computer, a smartphone, a tablet terminal, or the like).

For a case where it is determined in step S601 not to determine a type of organism to be induced or controlled (step S601: No), the controller 140 obtains the power setting values (for example, the voltage, the frequency, and the duty ratio) for all types of organisms from the first setting table 502 (see FIG. 5) stored in the memory 142 in step S602. The controller 140 then proceeds to step S605.

For a case where it is determined in step S601 to determine a type of organism to be induced or controlled (step S601: Yes), the controller 140 determines a type of an organism to be induced or controlled by the organism inducing device 100 (step S603). For example, a type of an organism to be induced or controlled by the organism inducing device 100 is set from an external device (such as a personal computer, a smart phone, a tablet terminal, or the like).

Next, in step S604, the controller 140 obtains the power setting values (for example, the voltage, the frequency, and the duty ratio) corresponding to the type of an organism determined in step S603 from the first setting table 502 (see FIG. 5) stored in the memory 142. The controller 140 then proceeds to step S605.

In step S605, the controller 140 determines electrodes 120 to which power is supplied from among the electrodes 120 of the organism inducing device 100. For example, the electrodes 120 to which power is supplied are set from an external device (such as a personal computer, a smartphone, a tablet terminal, or the like). The electrodes 120 to which power is supplied may be predetermined electrodes or all of the electrodes 120.

Next, the controller 140 sets the power setting values obtained in step S602 or step S604 to the electrodes 120 determined in step S605 (step S606). The power setting values that have been thus set to the electrodes 120 in step S606 are set in the second setting table 504 (see FIG. 5) stored in memory 142, for example.

Next, in step S607, the controller 140 generates alternating-current power based on the power setting values (for example, the voltage, the frequency, and the duty ratio) set in step S606 and supplies the generated alternating-current power to each of the electrodes 120 determined in step S605. The controller 140 then ends the series of control steps illustrated in FIG. 6.

The alternating-current power to be supplied to the electrodes 120 in step S607 may be rectangular-wave power or sine-wave power. The frequency of the alternating-current power to be supplied to the electrodes 120 in step S607 may vary over time with respect to a center frequency that is a predetermined frequency (for example, 1 KHz). This allows the organism inducing device 100 to, with electrodes 120, induce or control various organisms having sensitivity to power of various peak frequencies. In such a case, the frequency of the alternating-current power to be supplied to the electrodes 120 may be switched among a predetermined plurality of frequencies sequentially or randomly.

The control scheme illustrated in FIG. 6 allows the controller 140 to supply, to the electrodes 120 included in a predetermined area or all of the electrodes 120, power based on the power setting values suitable for inducing or controlling a predetermined type of an organism or a plurality of types of organisms. As a result, an area is formed that is a part or all on the top surface of the organism inducing device 100 to control a predetermined type of an organism or a plurality of types of organisms. In response to a predetermined type of an organism or a plurality of types of organisms moving on the top surface of the organism inducing device 100 and coming into contact with electrodes included in the formed area, the organisms are stimulated by the power and caused to escape from the area. In this regard, because the power to be supplied to the electrodes 120 is based on a voltage value that does not kill the predetermined type of an organism or the plurality of types of organisms, the predetermined type of an organism or the plurality of types of organisms escape from the area without being killed in the area. Accordingly, the organism inducing device 100 according to the present carrying-out mode can be used also for catching the predetermined type of an organism or the plurality of types of organisms alive.

The method of separately controlling power to be supplied to each of electrodes 120 is not limited to the method illustrated in FIG. 6. For example, power setting values for each of electrodes 120 may be directly set to the second setting table 504 (see FIG. 5) from an external device (such as a personal computer, a smartphone, a tablet terminal, or the like). In addition, the power setting values of each of electrodes 120 may be directly switchable with a dip switch or the like provided to the controller 140.

[First Embodiment of Organism Inducing Device 100]

Next, a first embodiment of the organism inducing device 100 will be described with reference to FIG. 7. As the first embodiment, an example of preventing entry of an organism 30 into a controlling area 20 including a house 22 by the organism inducing device 100 will be described.

Figure 7A:
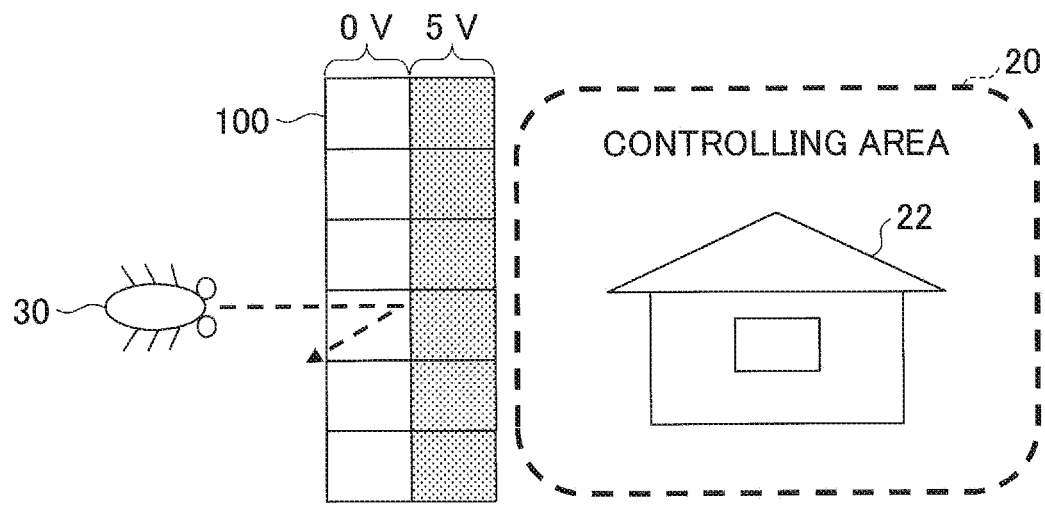
FIG. 7A illustrates a first embodiment of the organism inducing device according to the mode for carrying out the present invention.
Figure 7B:
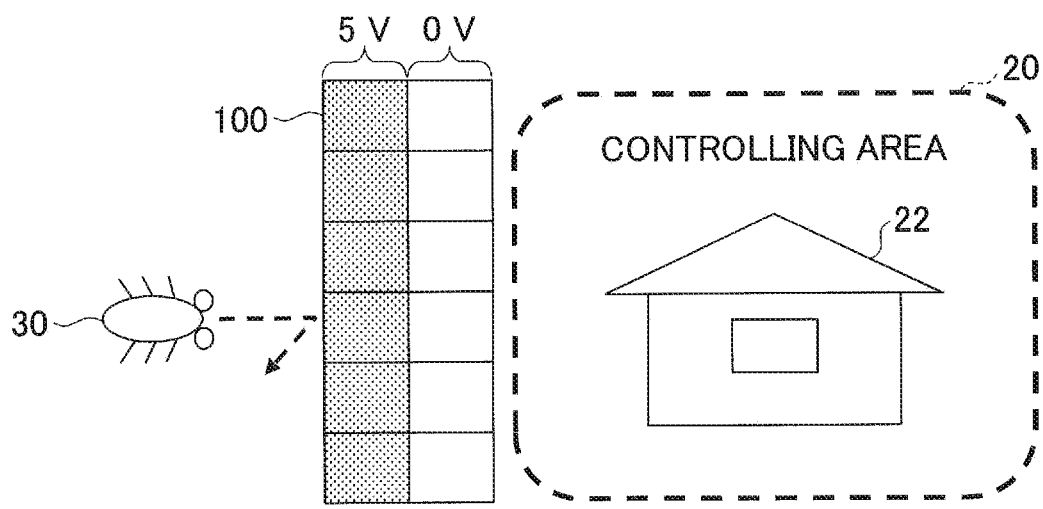
FIG. 7B illustrates the first embodiment of the organism inducing device according to the mode for carrying out the present invention.
Figure 7C:
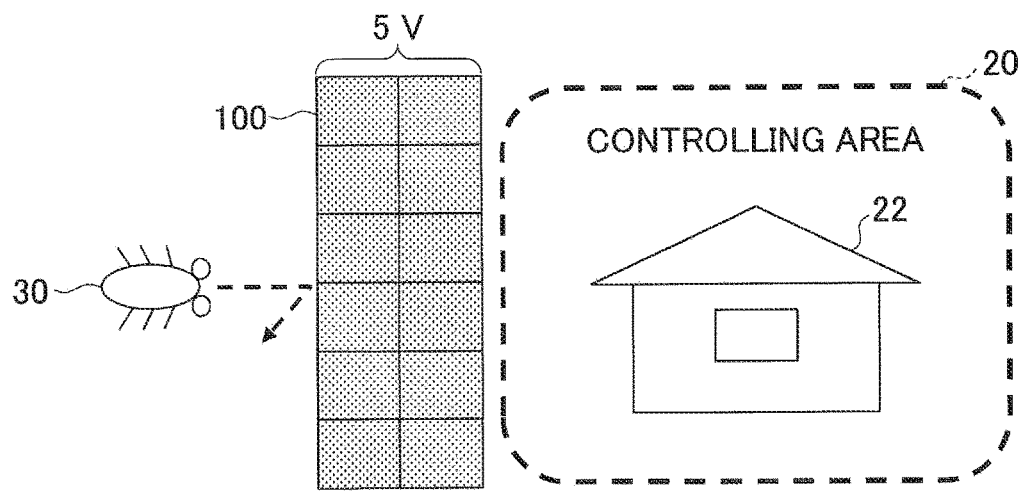
FIG. 7C is a diagram illustrating the first embodiment of the organism inducing device according to the mode for carrying out the present invention.

FIG. 7 illustrates the first embodiment of the organism inducing device 100 according to the mode for carrying out the present invention. As illustrated in FIGS. 7A-7C of FIG. 7, a plurality of organism inducing devices 100 are arranged in a matrix (2 rows by 6 columns) on a side of a controlling area 20 to block an approach path to the controlling area 20.

The organism inducing devices 100 shaded in FIGS. 7A-7C represent organism inducing devices 100 where alternating-current power of 5 V (a voltage value suitable to control an organism 30) is supplied to each of the electrodes 120. The organism inducing devices 100 not shaded in FIGS. 7A-7C represent organism inducing devices 100 where alternating-current power is not supplied to any one of the electrodes 120.

In the example illustrated in FIG. 7A, the organism inducing devices 100 on the inner row (nearer to the controlling area 20) are organism inducing devices 100 where 5 V alternating-current power is supplied to each of the electrodes 120 whereas organism inducing devices 100 on the outer row are organism inducing devices 100 where alternating-current power is not supplied to any one of the electrodes 120. Thus, in the example illustrated in FIG. 7A, the organism inducing devices 100 on the inner row are configured to prevent entry of an organism 30 into the controlling area 20.

In the example illustrated in FIG. 7B, the organism inducing devices 100 on the outer row are organism inducing devices 100 where 5 V alternating-current power is supplied to each of the electrodes 120 whereas the organism inducing devices 100 on the inner row are organism inducing devices 100 where alternating-current power is not supplied to any one of the electrodes 120. Thus, in the example illustrated in FIG. 7B, the organism inducing devices 100 on the outer row are configured to prevent entry of an organism 30 into the controlling area 20.

In the example illustrated in FIG. 7C, all of the organism inducing devices 100 are organism inducing devices 100 where 5 V alternating-current power is supplied to each of the electrodes 120. Thus, in the example illustrated in FIG. 7C, all of the organism inducing devices 100 are configured to prevent entry of an organism 30 into the controlling area 20.

In the present embodiment, it is possible to set for each of the plurality of organism inducing devices 100 whether to supply 5 V alternating-current power to each of the electrodes 120. Thus, in the present embodiment, as illustrated in FIGS. 7A-7C, it is possible to set only predetermined organism inducing devices 100 (for example, organism inducing devices 100 at positions where it is desired to prevent entry of an organism 30) as organism inducing devices 100 where alternating-current power is supplied to each of the electrodes 120.

In the present embodiment, such a setting of organism inducing devices 100 mentioned above can be easily implemented, for example, from an external device (such as a personal computer, a smartphone, a tablet terminal, or the like) that can be connected to the organism inducing devices 100, with dip switches provided to the organism inducing devices 100, or the like. In addition, such a setting for the organism inducing devices 100 mentioned above may be made not only just when the organism inducing devices 100 are installed on a predetermined installation surface but also after the organism inducing devices 100 are installed on the predetermined installation surface.

[Second Embodiment of Organism Inducing Device 100]

Next, a second embodiment of the organism inducing device 100 will be described with reference to FIG. 8. As the second embodiment, an example of inducing organisms 30 and 50 into a catching area 40 by a single organism inducing device 100 (with a plurality of electrodes 120) will be described.

Figure 8A:
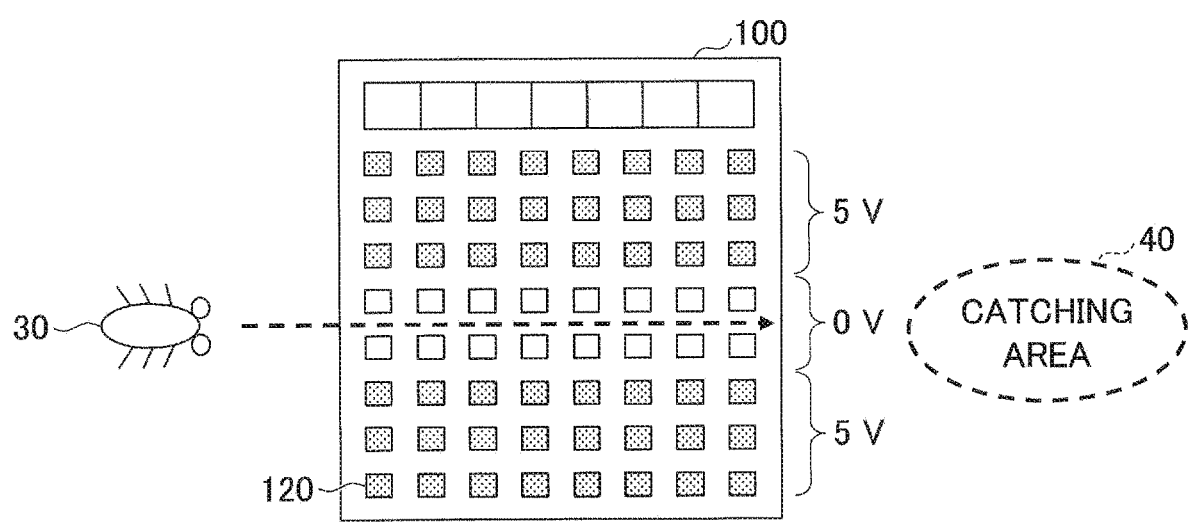
FIG. 8A illustrates a second embodiment of the organism inducing device according to the mode for carrying out the present invention.
Figure 8B:
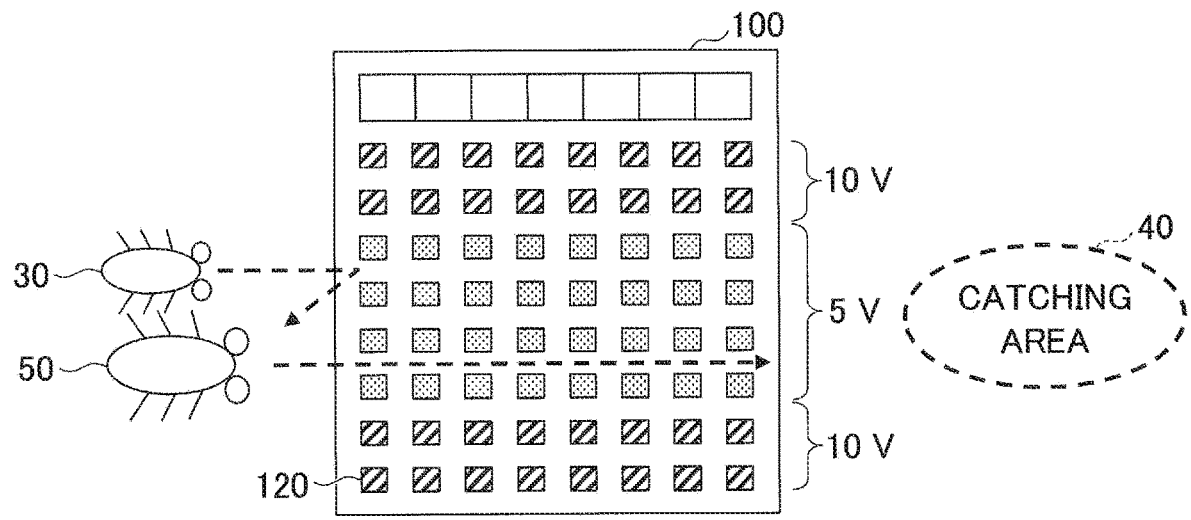
FIG. 8B illustrates the second embodiment of the organism inducing device according to the mode for carrying out the present invention.

FIG. 8 illustrates the second embodiment of the organism inducing device 100 according to the mode for carrying out the present invention. As illustrated in FIGS. 8A and 8B of FIG. 8, a single organism inducing device 100 is provided on a side of a catching area 40 to block an approach path to the catching area 40.

The electrodes 120 shaded in FIGS. 8A and 8B are supplied with alternating-current power of 5 V (a voltage value suitable to control of an organism 30). The electrodes 120 not shaded in FIG. 8A are not supplied with alternating-current power. The electrodes 120 hatched in FIG. 8B are supplied with alternating-current power of 10 V (a voltage value suitable to control of an organism 50).

In the example illustrated in FIG. 8A, alternating-current power of 5 V (the voltage value suitable to control an organism 30) is supplied to each of the electrodes 120 on the first through third and sixth through eighth columns from the top, whereas alternating-current power is not supplied to the electrodes 120 on any one of the fourth and fifth columns from the top. Thus, on the top surface of the organism inducing device 100, a first area where an organism 30 is controlled is formed by the electrodes 120 on the first through third columns from the top. In addition, a second area where an organism 30 is controlled is formed by the electrodes 120 on the sixth through eighth columns from the top. A third area is then formed between the first area and the second area where an organism 30 is not controlled. As a result, an organism 30 avoids the first area and the second area and moves in the third area on the top surface of the organism inducing device 100. Therefore, for example, as illustrated in FIG. 8A, by providing a catching area 40 on an extension of the third area, an organism 30 can be induced to the catching area 40 so that it is possible to efficiently catch the organism 30.

In the example illustrated in FIG. 8B, alternating-current power of 10 V (the voltage value suitable to control of an organism 50) is supplied to each of the electrodes 120 on the first, second, seventh, and eighth columns from the top, whereas alternating-current power of 5 V (the voltage value suitable to control of an organism 30) is supplied to each of the electrodes 120 on the third through sixth columns from the top. Thus, on the top surface of the organism inducing device 100, a first area where both an organism 30 and an organism 50 are controlled is formed by the electrodes 120 on the first and second columns from the top. In the same way, a second area is formed on the top surface of the organism inducing device 100 where both an organism 30 and an organism 50 are controlled by the electrodes 120 on the seventh and eighth columns from the top. A third area is then formed between the first area and the second area where only an organism 30 is controlled. As a result, an organism 30 is unable to move on the top surface of the organism inducing device 100. That is, an organism 30 is prevented from entering the catching area 40 by the organism inducing device 100. Meanwhile, an organism 50 avoids the first area and the second area and moves in the third area on the top surface of the organism inducing device 100. Therefore, for example, as illustrated in FIG. 8B, by providing a catching area 40 on an extension of the third area, an organism 50 can be induced to the catching area 40 so that it is possible to efficiently catch the organism 50.

Thus, the organism inducing device 100 of the present embodiment can separately set alternating-current power to be supplied the electrodes 120 on a per-electrode 120 basis. Thus, the organism inducing device 100 of the present embodiment may be configured to induce a predetermined organism to a desired area, as illustrated in FIG. 8A. In addition, the organism inducing device 100 of the present embodiment may be also configured to induce another predetermined organism to a desired area while preventing an entry of one predetermined organism, as illustrated in FIG. 8B.

Such a setting for each of the electrodes 120 can be easily implemented, for example, from an external device (such as a personal computer, a smartphone, a tablet terminal, or the like) that can be connected to the organism inducing device 100, with dip switches provided to the organism inducing device 100, or the like. In addition, such a setting for each of the electrodes 120 can be implemented not only just when the organism inducing device 100 is installed on the installation surface but also after the organism inducing device 100 is installed on the installation surface.

[Third Embodiment of Organism Inducing Device 100]

Next, a third embodiment of the organism inducing device 100 will be described with reference to FIG. 9. As the third embodiment, one example of inducing organisms 30 and 50 to a catching area 40 by a plurality of organism inducing devices 100 will be described.

Figure 9A:
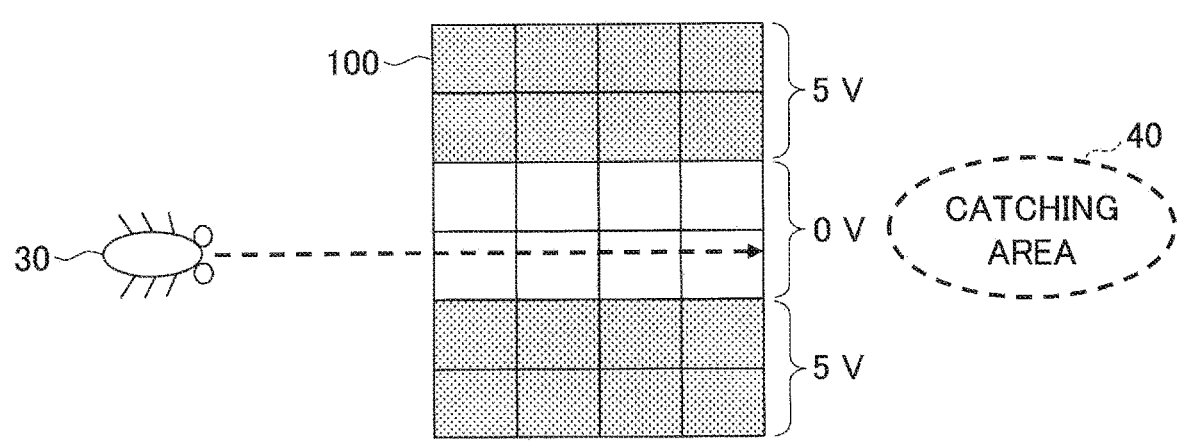
FIG. 9A illustrates a third embodiment of the organism inducing device according to the mode for carrying out the present invention.
Figure 9B:
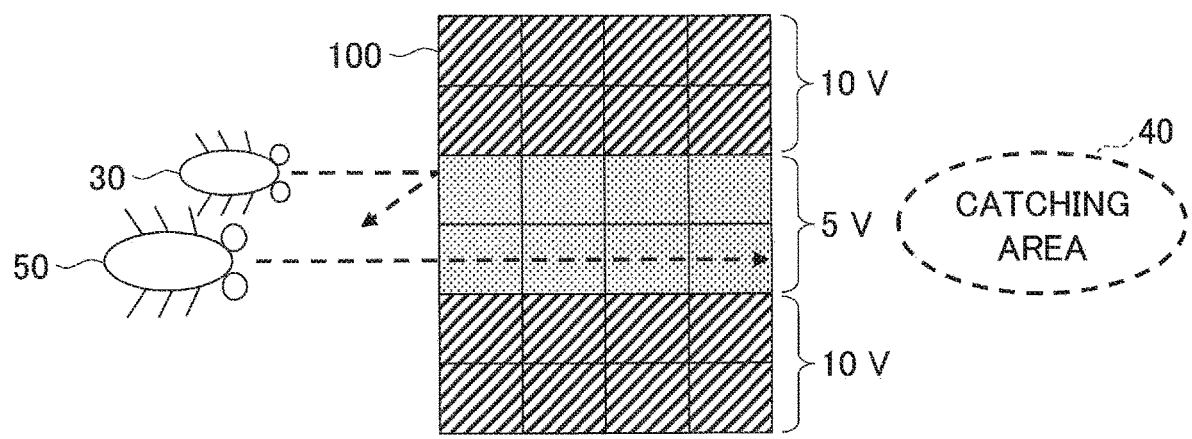
FIG. 9B illustrates the third embodiment of the organism inducing device according to the mode for carrying out the present invention.

FIG. 9 illustrates the third embodiment of the organism inducing device 100 according to the mode for carrying out the present invention. As illustrated in FIGS. 9A and 9B of FIG. 9, on a side of the catching area 40, a plurality of organism inducing devices 100 are arranged in a matrix (4 rows by 6 columns) to block an approach path to the catching area 40.

The organism inducing devices 100 shaded in FIGS. 9A and 9B represent organism inducing devices 100 where alternating-current power of 5 V (a voltage value suitable to control of an organism 30) is supplied to each of the electrodes 120. The organism inducing devices 100 not shaded in FIG. 9A represent organism inducing devices 100 where alternating-current power is not supplied to any one of the electrodes 120. The organism inducing devices 100 hatched in FIG. 9B represent organism inducing devices 100 where alternating-current power of 10 V (a voltage value suitable to control of an organism 50) is supplied to each of the electrodes 120.

In the example illustrated in FIG. 9A, in each of the organism inducing devices 100 on the first, second, fifth, and sixth columns from the top, alternating-current power of 5 V (the voltage value suitable to control an organism 30) is supplied to each of the electrodes 120, whereas, in each of the organism inducing devices 100 on the third and fourth columns from the top, alternating-current power is not supplied to any one of the electrodes 120. Thus, in the present embodiment, the organism inducing devices 100 on the first and second columns from the top form a first area where an organism 30 is controlled. In the same way, also a second area where an organism 30 is controlled is formed by the organism inducing devices 100 on the fifth and sixth columns from the top. A third area is then formed between the first area and the second area where an organism 30 is not controlled. As a result, in the present embodiment, an organism 30 avoids the first area and the second area and moves in the third area. Therefore, for example, as illustrated in FIG. 9A, by providing a catching area 40 on an extension of the third area, an organism 30 can be induced to the catching area 40 so that it is possible to efficiently catch the organism 30.

In the example illustrated in FIG. 9B, in each of the organism inducing devices 100 on the first, second, fifth, and sixth columns from the top, alternating-current power of 10 V (a voltage value suitable to control of an organism 50) is supplied to each of the electrodes 120. In addition, in each of the organism inducing devices 100 on the third and fourth columns from the top, alternating-current power of 5 V (a voltage value suitable to control an organism 30) is supplied to each of the electrodes 120. Thus, in the present embodiment, the organism inducing devices 100 on the first and second columns from the top form a first area where both an organism 30 and an organism 50 are controlled. In the same way, the organism inducing devices 100 on the fifth and sixth columns from the top form a second area where both an organism 30 and an organism 50 are controlled. A third area is then formed between the first area and the second area where only an organism 30 is controlled. As a result, an organism 30 is unable to move on the top surfaces of the plurality of organism inducing devices 100. That is, an entry of an organism 30 to the catching area 40 is prevented by the plurality of organism inducing devices 100. Meanwhile, an organism 50 avoids the first area and the second area and moves in the third area on the top surface of the plurality of organism inducing devices 100. Therefore, for example, as illustrated in FIG. 9B, by providing a catching area 40 on an extension of the third area, an organism 50 can be induced to the catching area 40 so that it is possible to efficiently catch the organism 50.

Thus, in the configuration of the present embodiment, alternating-current power to be supplied to organism inducing devices 100 can be separately set on a per-organism inducing device 100 basis. Thus, the configuration of the present embodiment may be configured to induce a predetermined organism to a desired area as illustrated in FIG. 9A. In addition, the configuration of the present embodiment may be also configured to induce another predetermined organism to a desired area while preventing an entry of one predetermined organism as illustrated in FIG. 9B.

In the present embodiment, such a setting for each of the organism inducing devices 100 can be easily implemented, for example, from an external device (such as a personal computer, a smartphone, a tablet terminal, or the like) that can be connected to each of the organism inducing devices 100, with a dip switch provided to each of the organism inducing device 100s, or the like. In addition, such a setting for each of the organism inducing devices 100 may be performed not only just when the organism inducing devices 100 are installed on the installation surface but also after the organism inducing devices 100 are installed on the installation surface.

[Variant of Organism Inducing Device 100]

Figure 10:
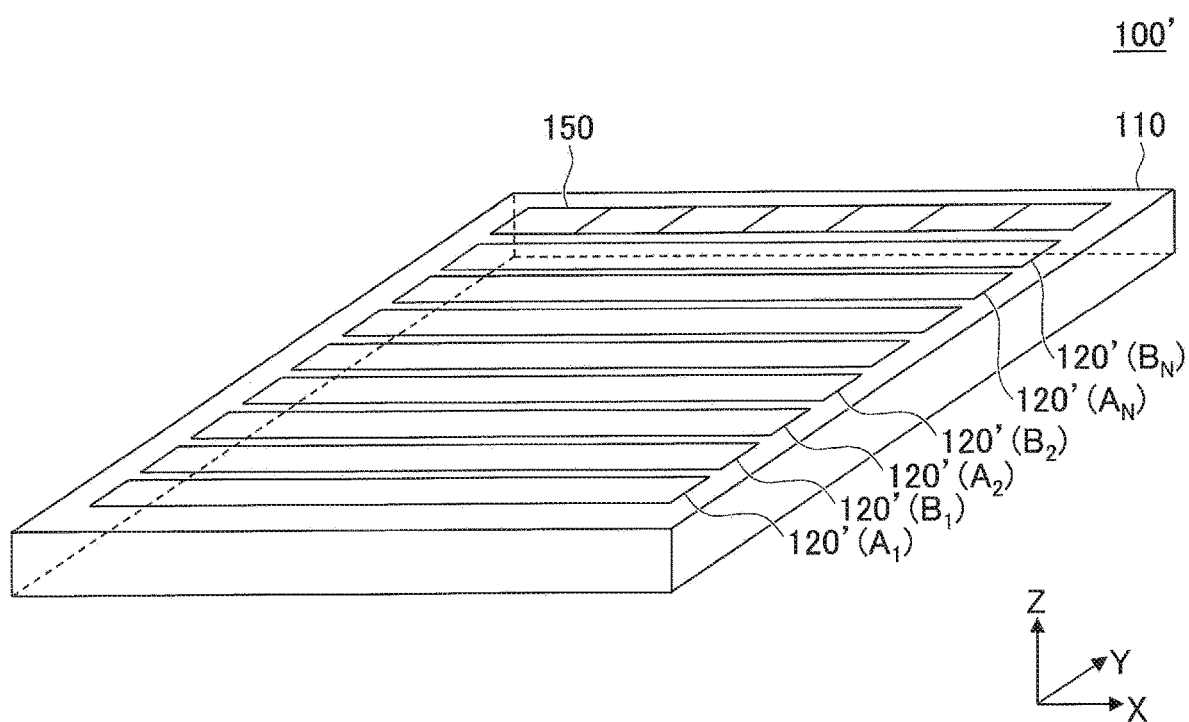
FIG. 10 is an external perspective view of an organism inducing device according to a variant in the present invention.

Next, a variant of the organism inducing device 100 will be described with reference to FIG. 10. An organism inducing device 100' in the variant is different from the organism inducing device 100 in that the shapes and the arrangement of the electrodes are different. FIG. 10 is an external perspective view of the organism inducing device 100' in the variant according to the present invention. Below, differences from the organism inducing device 100 will be described.

As illustrated in FIG. 10, the organism inducing device 100' includes a plurality of electrodes 120'. Each of the electrodes 120' is like a strip extending along an X-axis direction of FIG. 10. The electrodes 120 are arranged in a Y-axis direction of FIG. 10 in the top surface of the body 110. In the example illustrated in FIG. 10, the eight electrodes 120' are arranged in the Y-axis direction of FIG. 10 in the top surface of the body 110. The electrodes 120' may be made of a conductive material such as, for example, copper, copper tungsten, silver tungsten, brass, aluminum, or the like.

The electrodes 120' include first electrodes $A_1, A_2, \ldots, A_N$ and second electrodes $B_1, B_2, \ldots, B_N$. N is an integer greater than or equal to 1, and, in the example, N is 4. The first electrodes are supplied with alternating-current power having a voltage polarity different from a voltage polarity of alternating-current power to be supplied to the second electrodes. For example, for a case where alternating-current power with a positive voltage polarity is supplied to the first electrodes, alternating-current power with a negative voltage polarity is supplied to the second electrodes. In the same way, for a case where alternating-current power with a negative voltage polarity is supplied to the first electrodes, alternating-current power with a positive voltage polarity is supplied to the second electrodes. As illustrated in FIG. 10, in the top surface of the body 110, the first electrodes and the second electrodes are alternately arranged in the Y-axis direction. This allows two electrodes 120 next to one another to be supplied with alternating-current power with mutually different voltage polarities so that an organism contacting these two electrodes 120 is damaged due to such alternating-current power.

[Embodiment of Organism Inducing Device 100']

Next, an embodiment of the organism inducing device 100' will be described with reference to FIG. 11. As the present embodiment, an example of inducing organisms 30 and 50 into a catching area 40 by the single organism inducing device 100' (with the plurality of electrodes 120') will be described.

Figure 11A:
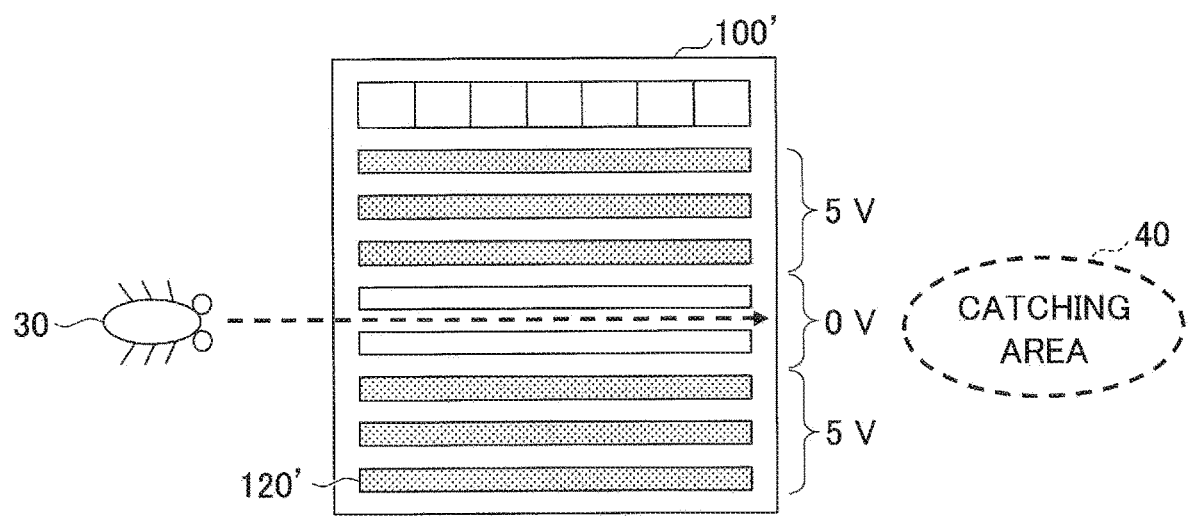
FIG. 11A illustrates an embodiment of the organism inducing device according to the variant in the present invention.
Figure 11B:
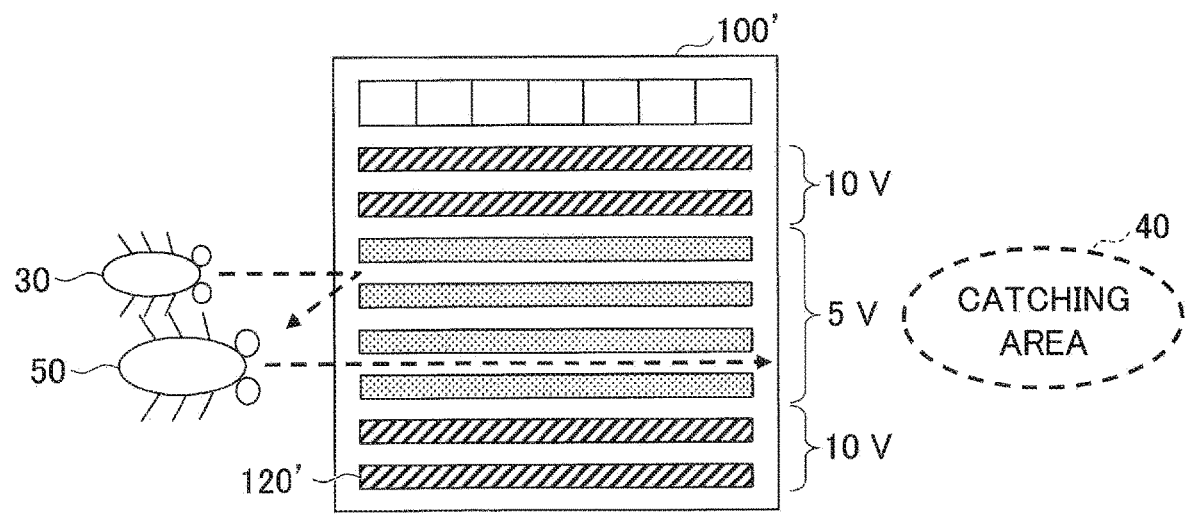
FIG. 11B is a diagram illustrating the embodiment of the organism inducing device according to the variant in the present invention.

FIG. 11 illustrates the embodiment of the organism inducing device 100' according to the variant in the present invention. As illustrated in FIGS. 11A and 11B of FIG. 11, on a side of a catching area 40, the single organism inducing device 100' is provided to block an approach path to the catching area 40.

The electrodes 120' shaded in FIGS. 11A and 11B represent electrodes 120' to which alternating-current power of 5 V (a voltage value suitable to control an organism 30) is supplied. The electrodes 120' not shaded in FIG. 11A represent electrodes 120' to which alternating-current power is not supplied. The electrode 120' hatched in FIG. 11B represent electrodes 120' to which alternating-current power of 10 V (a voltage value suitable to control an organism 50) is supplied.

In the example illustrated in FIG. 11A, the alternating-current power of 5 V (the voltage value suitable to control an organism 30) is supplied to each of the electrodes 120' on the first through third and sixth through eighth columns from the top, whereas alternating-current power is not supplied to any one of the electrodes 120' on the fourth and fifth columns from the top. Thus, on the top surface of the organism inducing device 100', a first area where an organism 30 is controlled is formed by the electrode 120' on the first through third columns from the top. In the same way, the electrodes 120' on the sixth through eighth columns from the top form a second area where an organism 30 is controlled. A third area is then formed between the first area and the second area where an organism 30 is not controlled. As a result, an organism 30 avoids the first area and the second area and moves in the third area on the top surface of the organism inducing device 100'. Therefore, for example, as illustrated in FIG. 11A, by providing a catching area 40 on an extension of the third area, an organism 30 can be induced to the catching area 40 so that it is possible to efficiently catch the organism 30.

In the example illustrated in FIG. 11B, the alternating-current power of 10 V (the voltage value suitable to control an organism 50) is supplied to each of the electrodes 120' on the first, second, seventh, and eighth columns from the top. Meanwhile, the alternating-current power of 5 V (the voltage value suitable to control an organism 30) is supplied to each of the electrodes 120' on the third through sixth columns from the top. As a result, on the top surface of the organism inducing device 100', a first area where both an organism 30 and an organism 50 are controlled is formed by the electrodes 120' on the first and second columns from the top. In the same way, also a second area where both an organism 30 and an organism 50 are controlled is formed by the electrodes 120' on the seventh and eighth columns from the top. A third area is then formed between the first area and the second area where only an organism 30 is controlled. As a result, an organism 30 is unable to move on the top surface of the organism inducing device 100'. That is, an organism 30 is prevented from entering the catching area 40 by the organism inducing device 100'. Meanwhile, an organism 50 avoids the first area and the second area and moves in the third area on the top surface of the organism inducing device 100'. Therefore, for example, as illustrated in FIG. 11B, by providing a catching area 40 on an extension of the third area, an organism 50 can be induced to the catching area 40 so that it is possible to efficiently catch the organism 50.

Thus, the organism inducing device 100' of the present embodiment can separately set alternating-current power to be supplied to the electrodes 120' on a per-electrode 120' basis. Thus, the organism inducing device 100' of the present embodiment may be configured to induce a predetermined organism to a desired area, as illustrated in FIG. 11A. In addition, the organism inducing device 100' of the present embodiment may be also configured to induce another predetermined organism to a desired area while preventing an entry of one predetermined organism, as illustrated in FIG. 11B.

Such a setting for each of the electrodes 120' can be easily implemented, for example, by an external device (such as a personal computer, a smartphone, a tablet terminal, or the like) that can be connected to the organism inducing device 100', with dip switches provided to the organism inducing device 100', or the like. In addition, such a setting for each of the electrodes 120' can be performed not only just when the organism inducing device 100' is installed on the installation surface but also after the organism inducing device 100' is installed on the installation surface.

As described above, each of the organism inducing devices 100 and 100' according to the present carrying-out modes includes a tile-shaped body 110; a plurality of electrodes 120 or 120' provided in a top surface of the body 110; and a controller 140 (a control means) that can separately control power to be supplied to each of the electrodes 120 or 120' using power supplied from a battery 130 (a predetermined power source).

Thereby, each of the organism inducing devices 100 and 100' of the present carrying-out modes can be easily installed according to the shape of an installation surface and an area to form an electric field can be variously changed.

Also, each of the organism inducing devices 100 and 100' according to the present carrying-out modes can form an electric field in such a manner that an organism can be induced in a predetermined direction by separately controlling power to be supplied to each of the electrodes 120 or 120'.

In particular, the organism inducing device 100 according to the present carrying-out mode includes the electrodes 120 arranged in a matrix in the top surface of the body 110. Thus, the organism inducing device 100 according to the present carrying-out mode can more effectively diversify the shape of the area forming the electric field. Therefore, the organism inducing device 100 according to the present carrying-out mode can more effectively diversify a direction in which an organism is induced.

Each of the organism inducing devices 100 and 100' according to the present carrying-out modes may be configured to form an inducing path (at an another area) to induce an organism on the top surface of the body 110 by supplying power to the electrodes 120 or 120' in one area and not supplying power to the electrodes 120 or 120' in the another area on the top surface of the body 110 by the controller 140. Thus, each of the organism inducing devices 100 and 100' according to the present carrying-out modes can induce an organism in a predetermined direction on the top surface of the body 110.

Each of the organism inducing devices 100 and 100' according to the present carrying-out modes may be also configured to form an inducing path (at an another area) to induce an organism on the top surface of the body 110 by supplying first power to the electrodes 120 or 120' in one area and second power having a voltage value lower than a voltage of the first power to the electrodes 120 or 120' in the another area on the surface of the body 110 by the controller 140. Thus, each of the organism inducing devices 100 and 100' according to the present carrying-out modes may be configured to induce one predetermined organism in a predetermined direction while preventing an entry of another predetermined organism (an organism smaller than the one predetermined organism) on the surface of the body 110.

Each of the organism inducing devices 100 and 100' according to the present carrying-out modes can also supply power based on a power setting value corresponding to a type of an organism to the electrodes 120, 120' in one area on the surface of the body 110. Thus, each of the organism inducing devices 100 and 100' according to the present carrying-out modes can induce a predetermined organism in a predetermined direction on the surface of the body 110.

In particular, each of the organism inducing devices 100 and 100' according to the present carrying-out modes is configured to include a voltage value that does not kill a type of an organism as a power setting value corresponding to the type of organism. Thus, each of the organism inducing devices 100 and 100' according to the present carrying-out modes can induce a predetermined organism in a predetermined direction on the top surface of the body 110 without killing the predetermined organism. Thus, each of the organism inducing devices 100 and 100' according to the present carrying-out modes can catch the predetermined organism alive.

An organism inducing device 100 or 100' according to the present carrying-out mode may be used and provided to provide an organism inducing unit by combining a plurality of such organism inducing devices 100 or 100'. Such an organism inducing unit can form an electric field to induce or control an organism for a wider area than a case of using an organism inducing device 100 or 100' alone. Also, by changing the arrangement of the plurality of organism inducing devices 100 or 100' in the organism inducing unit, it is possible to install the plurality of organism inducing devices 100 or 100' according to any one of various shapes of the installation surfaces.

Although the preferred carrying-out modes of the invention have been described in detail, the invention is not limited to these carrying-out modes, and various modifications or changes may be made within the scope of the claimed invention.

For example, the configurations (such as shape, size, number, arrangement, or the like) of the electrodes 120 or 120' in the top surface of the body 110 are not limited to those described concerning the above-described carrying-out modes.

In the above-described carrying-out modes, the single controller 140 is provided for the single organism inducing device 100 or 100'. However, a mode for carrying out the present invention is not limited thereto. For example, a single controller 140 may be provided for a plurality of organism inducing devices 100 or 100'. In addition, a controller 140 may be provided outside an organism inducing device 100.

In the above-described carrying-out modes, the single battery 130 is provided for the single organism inducing device 100 or 100'. However, a mode for carrying out the present invention is not limited thereto. For example, one battery 130 may be provided for a plurality of organism inducing devices 100 or 100'.

In the above-described carrying-out modes, a single fuse 160 is provided for one electrode 120 or 120'. However, a mode for carrying out the present invention is not limited thereto. For example, a single fuse 160 may be provided for a plurality of electrodes 120 or 120'. Further alternatively, a fuse 160 need not be provided.

In the above-described carrying-out modes, the single solar cell panel 150 is provided for the single organism inducing device 100 or 100'. However, a mode for carrying out the present invention is not limited thereto. For example, one solar cell panel 150 may be provided for a plurality of organism inducing devices 100 or 100'. In addition, the solar cell panel 150 may be provided outside the organism inducing device 100. Further alternatively, a solar cell panel 150 need not be provided.

In the above-described carrying-out modes, alternating-current power is supplied to electrodes 120. However, a mode for carrying out the present invention is not limited thereto. That is, DC power may be supplied to electrodes 120. Also in this case, it is preferable to supply DC power to electrodes 120 having, depending on the type of an organism to be controlled, a voltage value that does not kill the type of an organism.

The present international application claims priority to Japanese Patent Application No. 2017-156934 filed Aug. 15, 2017, the entire contents of which are hereby incorporated herein by reference.

DESCRIPTION OF REFERENCE NUMERALS

20 Controlling area
22 House
30, 50 Organisms
40 Catching area
100 Organism inducing device
110 Body
120 Electrode 130 Battery (power source)
140 Controller (control means)
142 Memory
150 Solar cell panel
160 Fuse (protective device)
502 First setting table
504 Second setting table

The invention claimed is:

1. An organism inducing device, installed on an installation surface, comprising:
  a tile-shaped body;
  a plurality of electrodes provided to a first area and a plurality of electrodes provided to a second area, wherein the first area and the second area are on a top surface of the body, wherein the second area is arranged inside the first area and forms an inducing path; and
  a processor configured to separately control power to be supplied to each of the electrodes, using power supplied from a predetermined power source,
  wherein the processor is configured to supply a first power to the plurality of electrodes in the first area, and to supply a second power to the plurality of electrodes in the second area, and
  wherein a voltage value of the second power is less than a voltage value of the first power that a first organism is induced along the inducing path and a second organism is not induced along the inducing path.

2. The organism inducing device as claimed in claim 1, wherein the top surface of the body has the electrodes arranged in a matrix.

3. The organism inducing device as claimed in claim 1, wherein respective protective devices are provided for the electrodes.

4. The organism inducing device as claimed in claim 1, comprising a secondary battery used as the predetermined power source.

5. The organism inducing device as claimed in claim 4, comprising a solar cell panel that outputs power applicable to charging the secondary battery.

6. The organism inducing device as claimed in claim 1, wherein the processor is configured to supply power based on a power setting value corresponding to a type of the first organism and a type of the second organism to the plurality of electrodes in the first area and the second area.

7. The organism inducing device as claimed in claim 6, wherein the power setting value corresponding to the type of the first organism includes a voltage value at which the first organism is not killed.

8. An organism inducing unit comprising a plurality of organism inducing devices each being installed on an installation surface and comprising:
  a tile-shaped body;
  a plurality of electrodes provided to a plurality of organism inducing devices in a first area and a plurality of inducing devices in a second area, wherein the first area and the second area are on a top surface of the body, wherein the second area is arranged inside the first area and forms an inducing path; and
  a processor configured to separately control power to be supplied to each of the electrodes, using power supplied from a predetermined power source,
  wherein a first power is supplied to the plurality of organism inducing devices in the first area, and a second power is supplied to the plurality of organism inducing devices in the second area, and
  wherein a voltage value of the second power is less than a voltage value of the first power that a first organism is induced along the inducing path and a second organism is not induced along the inducing path.

9. The organism inducing device as claimed in claim 8, wherein the processor is configured to supply power based on a power setting value corresponding to a type of the first organism and a type of the second organism to the plurality of electrodes in the first area and the second area.

10. The organism inducing device as claimed in claim 9, wherein the power setting value corresponding to the type of the first organism includes a voltage value at which the first organism is not killed.

* * * * *